US010210182B2

(12) United States Patent
Chang et al.

(10) Patent No.: US 10,210,182 B2
(45) Date of Patent: Feb. 19, 2019

(54) IMAGE SEARCH WITH HISTORICAL USER ACTIVITY METADATA

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 14/571,681

(22) Filed: Dec. 16, 2014

(65) Prior Publication Data

US 2016/0171016 A1 Jun. 16, 2016

(51) Int. Cl.
*G06F 17/30* (2006.01)

(52) U.S. Cl.
CPC .... *G06F 17/3028* (2013.01); *G06F 17/30265* (2013.01)

(58) Field of Classification Search
CPC ......... G06F 17/3028; G06F 17/30265
See application file for complete search history.

(56) References Cited

U.S. PATENT DOCUMENTS

| 7,283,927 | B2 | 10/2007 | Delargy |
| 2009/0210516 | A1 | 8/2009 | Roskowski |
| 2009/0216435 | A1* | 8/2009 | Zheng ............... G06F 17/3087 701/533 |
| 2011/0099199 | A1 | 4/2011 | Stalenhoef et al. |
| 2011/0167125 | A1 | 7/2011 | Achlioptas |
| 2012/0131028 | A1* | 5/2012 | Glachant .......... G06F 17/30241 707/758 |
| 2012/0233531 | A1 | 9/2012 | Ma et al. |

OTHER PUBLICATIONS

IBM, "System and Method to Enrich Images with Semantic Data", Jul. 30, 2007, IPCOM000156659D, Total 10 pp.
List of IBM Patents or Patent Applications Treated as Related, Total 2 pp, Aug. 19, 2015.
Preliminary Amendment, dated Aug. 19, 2015, for U.S. Appl. No. 14/830,580, filed Aug. 19, 2015 by B.W. Chang et al., Total 5 pp.
U.S. Patent Application with U.S. Appl. No. 14/830,580, filed Aug. 19, 2015, entitled, "Image Search With Historical User Activity Metadata", invented by B.W. Chang et al., Total 23 pp.
Office Action 1, dated Dec. 29, 2017, for U.S. Appl. No. 14/830,580, filed Aug. 19, 2015 by B.W. Chang et al., Total 16 pp.

(Continued)

*Primary Examiner* — Kristopher Andersen
(74) *Attorney, Agent, or Firm* — Janaki K. Davda; Konrad, Raynes, Davda & Victor LLP

(57) ABSTRACT

Provided are techniques for image search with historical user activity metadata. Activity of a user is continuously captured to generate historical user activity metadata. In response to an image being taken, a range of historical user activity metadata to associate with the image is selected, wherein the historical user activity metadata for the period of time forms a historical time line that becomes searchable metadata of the image. In response to a request for any images taken during the range, the image is located using the searchable historical user activity metadata.

10 Claims, 6 Drawing Sheets

(56) References Cited

OTHER PUBLICATIONS

Response to Office Action 1, dated Mar. 14, 2018, for U.S. Appl. No. 14/830,580, filed Aug. 19, 2015 by B.W. Chang et al., Total 13 pp.
Final Office Action for U.S. Appl. No. 14/830,580, pp. 21, dated May 29, 2018.
Response to Final Office Action for U.S. Appl. No. 14/830,580, pp. 16, dated Aug. 29, 2018.
Notice of Allowance for U.S. Appl. No. 14/830,580, pp. 12, dated Oct. 4, 2018.

* cited by examiner

IMAGE SEARCH WITH HISTORICAL USER ACTIVITY METADATA

FIELD

Embodiments of the invention relate to image search with historical user activity metadata.

BACKGROUND

While the price of storage space is going down, users are capturing many more photographs. Conventional systems allow a limited search of storage space to find particular photographs.

SUMMARY

Provided is a method for image search with historical user activity metadata. The method comprises capturing, with a processor of a computer, activity of a user continuously to generate historical user activity metadata; in response to an image being taken, selecting a range of historical user activity metadata to associate with the image, wherein the historical user activity metadata for the period of time forms a historical time line that becomes searchable metadata of the image; and, in response to a request for any images taken during the range, locating the image using the searchable historical user activity metadata.

Provided is a computer program product for image search with historical user activity metadata. The computer program product comprises a computer readable storage medium having program code embodied therewith, the program code executable by at least one processor to perform: capturing, by the at least one processor, activity of a user continuously to generate historical user activity metadata; in response to an image being taken, selecting, by the at least one processor, a range of historical user activity metadata to associate with the image, wherein the historical user activity metadata for the period of time forms a historical time line that becomes searchable metadata of the image; and, in response to a request for any images taken during the range, locating, by the at least one processor, the image using the searchable historical user activity metadata.

Provided is a computer system for image search with historical user activity metadata. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: capturing activity of a user continuously to generate historical user activity metadata; in response to an image being taken, selecting a range of historical user activity metadata to associate with the image, wherein the historical user activity metadata for the period of time forms a historical time line that becomes searchable metadata of the image; and, in response to a request for any images taken during the range, locating the image using the searchable historical user activity metadata.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
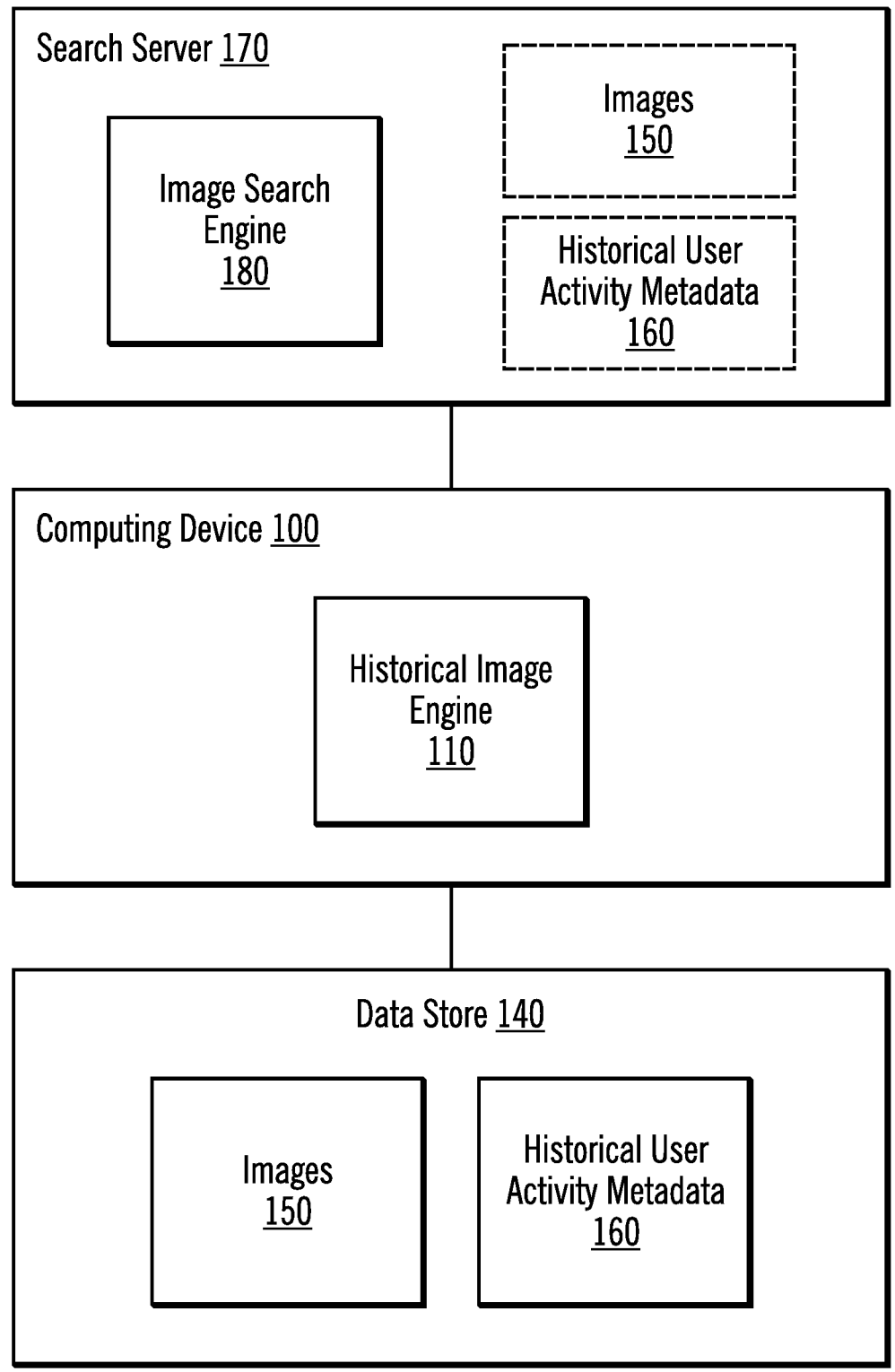
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 140 and to a search server 170. The computing device 100 includes an historical image engine 110. The data store 140 includes images 150 and associated historical user activity metadata 160 that is recorded by the historical image engine 110. The historical user activity metadata may also be referred to as "historical context" and provides the whereabouts of the user (e.g., locations of the user). In certain embodiments, the images are photographs. In certain embodiments, the images may be any type of image that may be associated with historical user activity metadata 160. The term "user" may be used to refer to any person or device capturing an image.

The historical image engine 110 captures historical user activity over a range of time and stores this as the historical user activity metadata 160. The historical user activity metadata 160 may include a timestamp, a geolocation for that timestamp, a radius, a speed, calendar information, travel data, user's activities (e.g., driving or walking) information provided by the user (e.g., ordered wine), etc. A geolocation may be described as a geographic location of an object (e.g., a street address). The radius may be used to determine points of interest within that radius.

The search server 170 includes an image search engine 180. The images 150 and the historical user activity metadata 160 may be uploaded to the search server 170 from the data store 140 coupled to the computing device 100. The image search engine 180 may associate points of interest with the images 150. In certain embodiments, the association of a point of interest with an image may be governed by when and where the image was taken in conjunction with where, historically, the user has been before or after the image was captured for some range of time.

In certain embodiments, a user's activity before, during, and after capturing an image (e.g., taking a photograph) is used to derive the context of the image. The following are some examples of a user's activity that may provide historical context:

1. User's work or day time schedule—Meetings, appointments, etc.
2. User's travel data—Route the user is following, a start time and/or end time of travel, a speed of travel, a mode of travel (e.g., car, plane, train, walking), etc.
3. User's event data—Watching a movie, playing a game, dining at home or at a restaurant, shopping, etc., where a point of interest is either at or nearby where the user was for an extended amount of time.

Once historical user activity metadata 160 is captured, the historical image engine 110 allows a user to search for images using this historical user activity metadata. For example, the user is able to search for an image with the following requirement: locate an image that was captured 10 minutes before or after the user entered into a restaurant. In various embodiments, the user may be the user who took the image, who is searching for the image or another, designated user. With embodiments, the user is searching historical data with a defined time line, and the historical image engine 110 uses this information to perform an image search and display image search results.

In certain embodiments, the computing device 100 is a mobile device (e.g., a smart phone), and the historical image engine 110 is stored on the mobile device of a user and records the user's activity detail continuously while matching a geolocation to points of interest (e.g., from public directories, personal bookmarks, personal contact information, etc.). The historical image engine 110 stores this historical user activity metadata. Then, when capturing an image, the historical image engine 110 provides the user with an option to add a range of the historical user activity metadata as part of the image metadata. In this case, the user may define a time line of historical user activity metadata as image metadata. For example, the user may define eight hours of historical user activity metadata before the image was captured and four hours after the image captured. In various embodiments, the historical image engine 110 allows the option of storing a range of historical user activity metadata each image that is captured as a default option (e.g., a default option that is always on or a default option that is on for a specific time window) or as a prompt option (in which case a user is prompted with each image capture to indicate whether to save the historical user activity metadata with the image). In certain embodiments, the historical user activity metadata may be stored in an image file with the photogram or may be stored externally with an image identifier that corresponds to an image identifier of the image. In certain embodiments, the historical image engine 110 allows a user to use the historical user activity metadata to search for one or more images.

Figure 2:
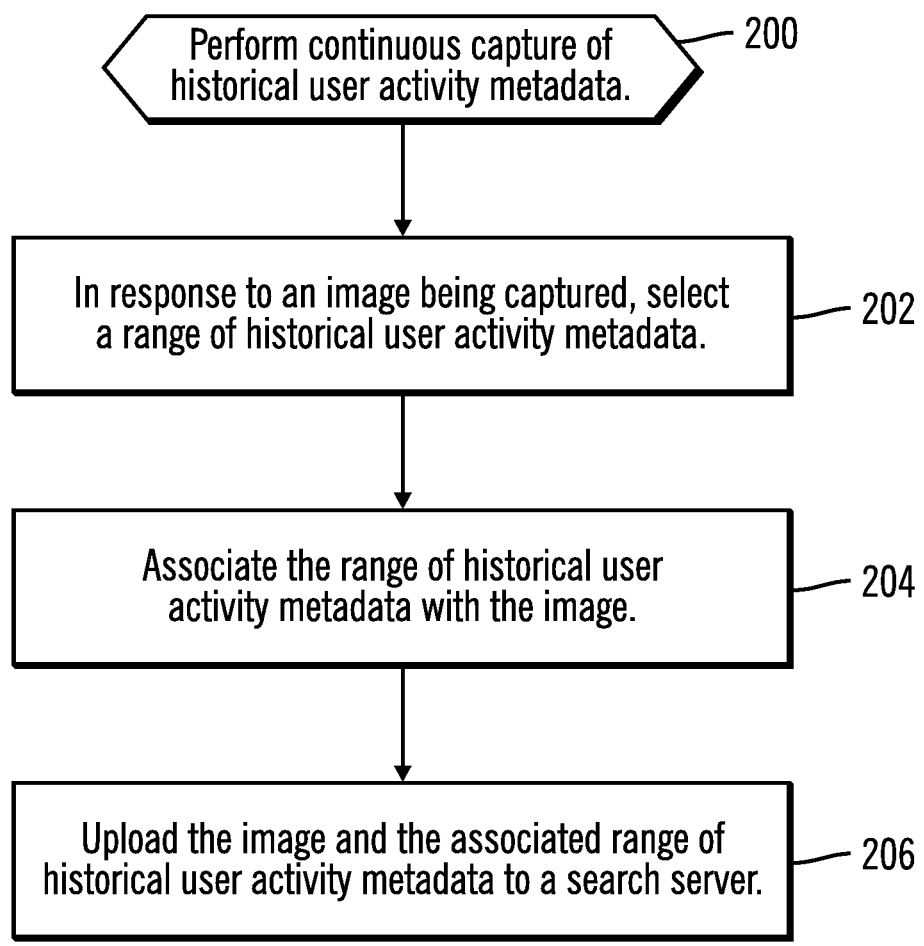
FIG. 2 illustrates, in a flow diagram, operations for capturing historical user activities in accordance with certain embodiments.

FIG. 2 illustrates, in a flow diagram, operations for capturing historical user activities in accordance with certain embodiments. Control begins at block 200 with the historical image engine 110 performing continuous capture of historical user activity metadata. In block 202, in response to an image being captured, the historical image engine 110 selects a range of historical user activity metadata. In certain embodiments, the range is set to a default (e.g., a certain number of hours before and/or after the image was captured). In other embodiments, the user is asked to identify the range (e.g., eight hours before the image was captured and four hours after the image was captured). In block 204, the historical image engine 110 associates the range of historical user activity metadata with the image. In block 206, the historical image engine 110 uploads the image and the associated range of historical user activity metadata to the search server. The range of historical user activity metadata includes, for example, a timestamp, a geolocation for that timestamp, a radius, calendar information, information provided by the user (e.g., ordered wine), etc.

Figure 3:
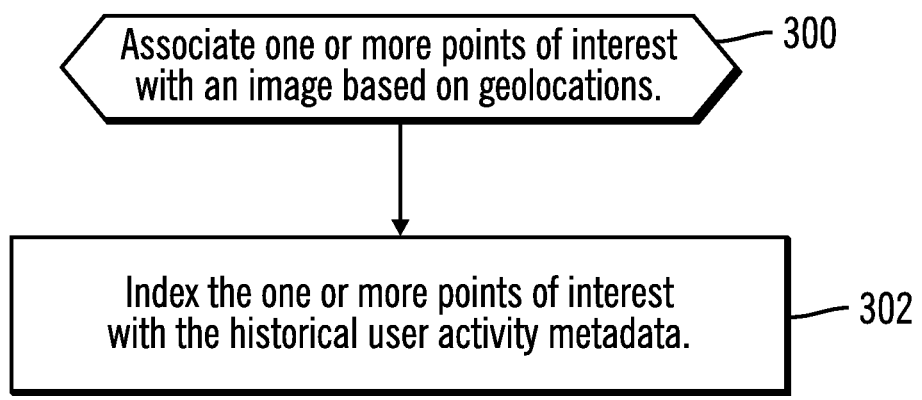
FIG. 3 illustrates, in a flow diagram, operations for associating points of interest with images in accordance with certain embodiments.

FIG. 3 illustrates, in a flow diagram, operations for associating points of interest with images in accordance with certain embodiments. Control begins at block 300 with the image search engine 180 associating one or more points of interest with an image based on the geolocation associated with the image. In certain embodiments, the points of interest are identified within a certain radius of the geolocation. In block 302, the image search engine 180 indexes the one or more points of interest with the historical user activity metadata (e.g., which has been uploaded to the search server 170. Then, searches for images may refer to the points of interest (e.g., find images taken after attending an amusement park).

Figure 4:
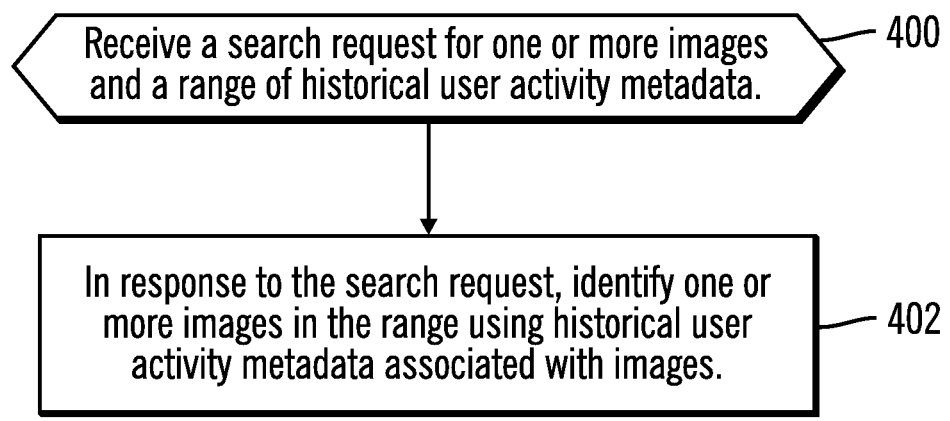
FIG. 4 illustrates in a flow diagram, operations for image search based on a range of historical user activity metadata.

FIG. 4 illustrates in a flow diagram, operations for image search based on a range of historical user activity metadata. Control begins at block 400 with the image search engine 180 receiving a search request for one or more images and a range of historical user activity metadata. In block 402, in response to the search request, the image search engine 180 identifies one or more images in the range using historical user activity metadata associated with images.

For example, a user may take an Eiffel tower image after finishing dinner and an Eiffel tower photograph after visiting an amusement park. In this case, the user may not remember the time when a photograph was taken of the Eiffel tower, but the user may remember that it was after a dinner engagement or after a fun time at an amusement park. Of course, with enough time, the user technically speaking may indirectly determine the time when these events occurred and then search for a photograph around that time. However, if there is historical user activity metadata stored away as part of each photograph's metadata, then whatever information the user remembers may be used for locating the photograph of interest. Embodiments leverage this metadata for locating a photograph, which may save a user time. With embodiments, the user does not need to trace through historical events to triangulate a time stamp and locate the photograph using the timestamp.

In certain embodiments, an interface of encapsulating the historical user activity metadata, such that the actual data content may be extended in the future, is provided. For example, today, geolocation/radius, name of place of interest, calendar schedule, etc. may be considered as part of the historical user activity metadata.

For geolocation/radius, the historical image engine 110 uses initial values (e.g., timestamp, longitude, lag, and radius). Once outside of that initial area, the historical image engine 110 may capture another set of values (e.g., timestamp, longitude, lag, radius). These sets of location values form the historical user activity metadata that describe the whereabouts of the user for a period of time (e.g., 24×7, a few hours, etc.). Of course, the radius may be configured to help balance resolution versus volume of data to be captured and may be changed dynamically, depending on the type of area of a location (e.g., shopping plaza vs airport terminal) or the speed of movement of the photograph taker (e.g., walking speed versus driving speed).

With the continues geolocation/radius information captured, the historical image engine 110 provides augmentation against a set of point of interests, such that the historical image engine 110 stores the actual name of locations as part of historical user activity metadata (e.g., a restaurant or amusement park).

Figure 5:
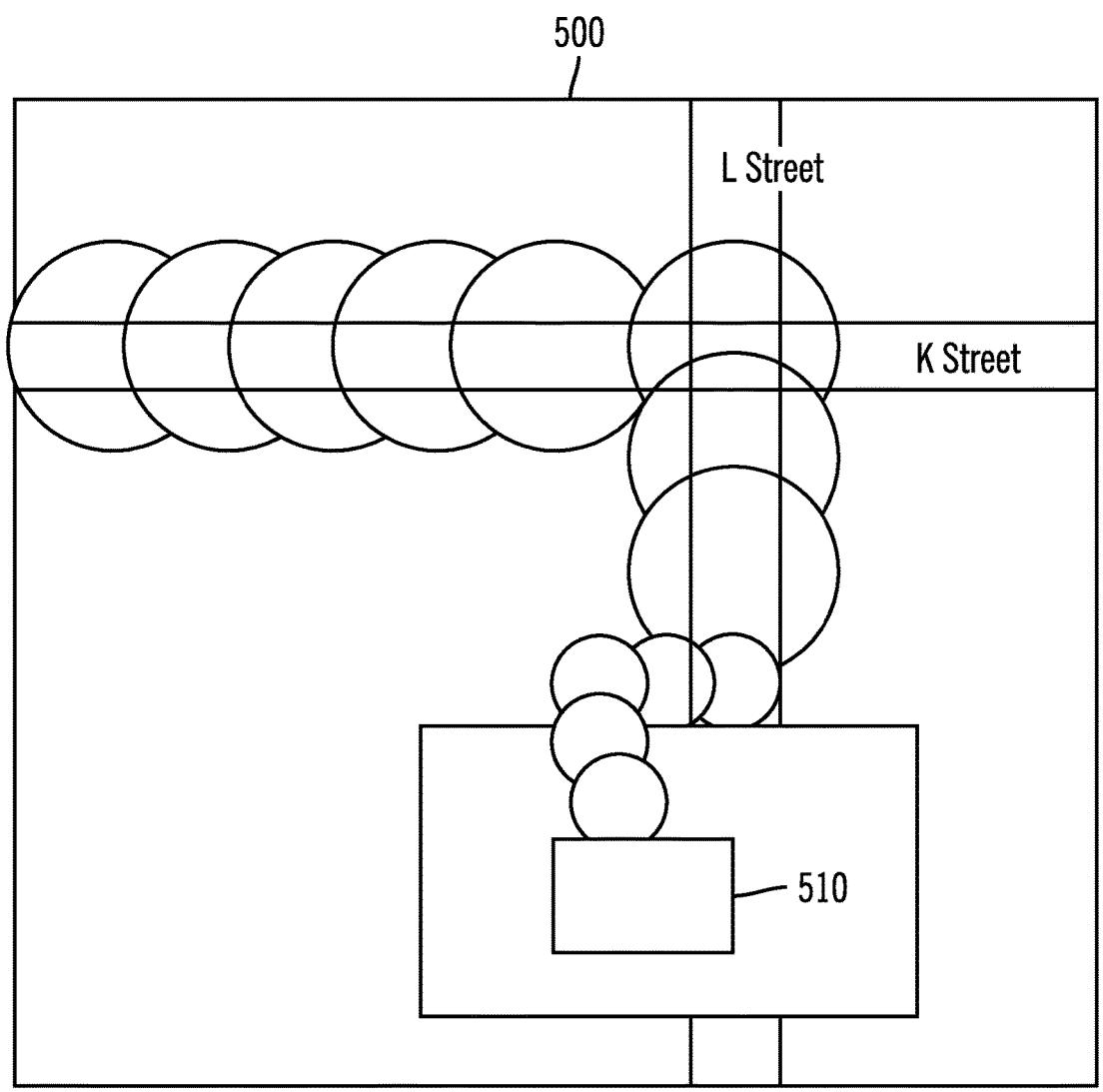
FIG. 5 illustrates a map in accordance with certain embodiments.

FIG. 5 illustrates a map 500 in accordance with certain embodiments. With reference to the map 500, a user with the computing device 100 that has the historical image engine 110 is driving along K street at 35 miles per hour (mph). With that speed, the historical image engine 110 captures historical user activity metadata at a less frequent rate (represented by the larger circles on map 500). During the drive, the user passes a train station. After 8 sets of historical user activity metadata (with each large circle representing one set of geolocation, timestamp, radius, speed, etc.), a user with the computing device 100 that has the historical image engine 110 starts walking, and the historical image engine 110 detects the slower speed and captures historical user activity metadata for a small radius (represented by the smaller circles on map 500). Then, the user walks to an endpoint 510 and takes photographs around that endpoint 510. A few days later (after the photographs were uploaded and the historical user activity metadata was indexed), the user does not remember with whom or at what exact time I the photographs were taken, but the user remembers that the photographs were taken after passing the train station. So, the user searches for photographs taken after driving by the train station. Now, since the photographs are stored with geolocations captured that also identify the points of interest that the user drove by, the photographs are tagged with historical user activity metadata containing driving speed across the train station. With that association to the photographs, the image search engine 180 is able to retrieve photographs that were taken by the user after driving by the train station.

In various embodiments, there may be other types of historical user activity metadata besides geolocation and points of interest, such as meetings attended based on the user's calendar. These calendar descriptions help augment not only where the user was, but what the user I was doing (e.g., walking in the park or meeting friends at a restaurant).

In various embodiments, other types of events may be made available and participate with the overall historical user activity metadata interface (i.e., pluggable data). For example, a college campus may want to map out all class lectures based on the time and location of all classes on campus. With such information, not only will photographs be searched by "photograph outside of classroom 201 after lunch at cafeteria", a student may be as specific as "photograph 2-4 hours after attending physics 101".

Moreover, users tend to remember the tasks they engaged with more than the places they were at. In certain embodiments, the historical image engine 110 allows others to participate to enrich the historical user activity metadata. As another example, a user may be able to search for photographs taken after watching a specific movie or after going to a particular theater.

Thus, embodiments enable searches for images with information already available to a user, rather than forcing the user to search with a specific input before locating the photograph successfully. With embodiments, the historical user activity metadata makes it easy to facilitate a photograph search.

Embodiments utilize historical user activity metadata as metadata for a specific image such that images may be found based on the historical user activity metadata.

Figure 6:
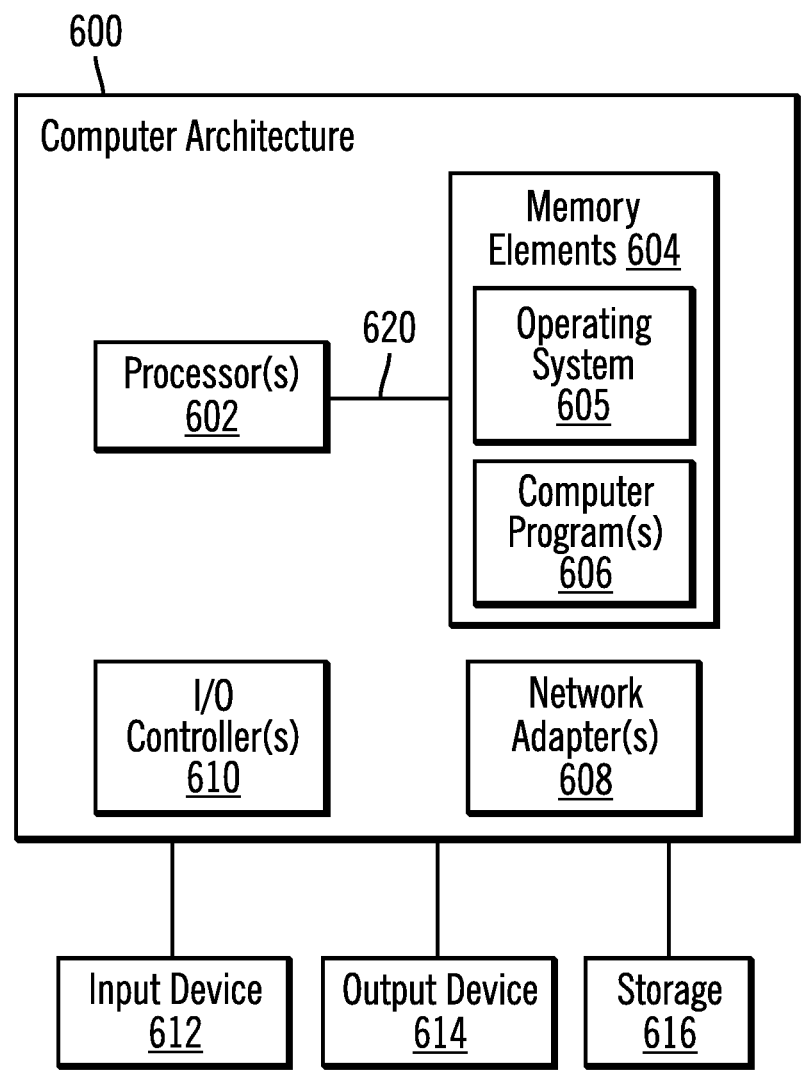
FIG. 6 illustrates, in a block diagram, a computer architecture that may be used in accordance with certain embodiments.

FIG. 6 illustrates a computer architecture 600 that may be used in accordance with certain embodiments. In certain embodiments, computing device 100 and/or search server 170 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., any type of storage device; a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor of a search server to perform:

storing, by the at least one processor of the search server, a range of historical user activity metadata associated with an image, wherein the range of the historical user activity metadata associated with the image forms a historical time line that becomes searchable metadata of the image, and wherein the range of the historical user activity metadata includes a user activity after the image is taken;

identifying, by the at least one processor of the search server, one or more points of interest within a radius of a geolocation of the image;

associating, by the at least one processor of the search server, the one or more points of interest with the image;

indexing, by the at least one processor of the search server, the one or more points of interest with the historical user activity metadata;

receiving, by the at least one processor of the search server, a search request that specifies the range of the historical user activity metadata, a point of interest of the one or more points of interest, and the user activity after the image is taken; and in response to the search request, locating, by the at least one processor of the search server, the image using the historical user activity metadata that is indexed with the point of interest of the one or more points of interest and that includes the user activity after the image is taken.

2. The computer program product of claim 1, wherein the range of the historical user activity metadata associated with the image includes a user activity before the image is taken.

3. The computer program product of claim 1, wherein the program code is executable by the at least one processor to perform:
   updating the range of the historical user activity metadata associated with the image after the image is taken.

4. The computer program product of claim 1, wherein the searchable metadata is stored separately from the image.

5. The computer program product of claim 1, wherein the historical user activity metadata includes a timestamp, a geolocation for that timestamp, a radius, a speed, calendar information, travel data, user's activities, and information provided by a user.

6. A computer system, comprising:
   search server having:
      one or more processors, one or more computer-readable memories and one or more computer-readable, tangible storage devices; and
      program instructions, stored on at least one of the one or more computer-readable, tangible storage devices for execution by at least one of the one or more processors via at least one of the one or more memories, to perform operations, the operations comprising:
         storing a range of historical user activity metadata associated with an image, wherein the range of the historical user activity metadata associated with the image forms a historical time line that becomes searchable metadata of the image, and wherein the range of the historical user activity metadata includes a user activity after the image is taken;
         identifying one or more points of interest within a radius of a geolocation of the image;
         associating the one or more points of interest with the image;
         indexing the one or more points of interest with the historical user activity metadata;
         receiving a search request that specifies the range of the historical user activity metadata, a point of interest of the one or more points of interest, and the user activity after the image is taken; and
         in response to the search request, locating the image using the historical user activity metadata that is indexed with the point of interest of the one or more points of interest and that includes the user activity after the image is taken.

7. The computer system of claim 6, wherein the range of the historical user activity metadata associated with the image includes a user activity before the image is taken.

8. The computer system of claim 6, wherein the operations further comprise:
   updating the range of the historical user activity metadata associated with the image after the image is taken.

9. The computer system of claim 6, wherein the searchable metadata is stored separately from the image.

10. The computer system of claim 6, wherein the historical user activity metadata includes a timestamp, a geolocation for that timestamp, a radius, a speed, calendar information, travel data, user's activities, and information provided by a user.

* * * * *